US012579050B2

(12) United States Patent
Tang et al.

(10) Patent No.: US 12,579,050 B2
(45) Date of Patent: Mar. 17, 2026

(54) LARGE LANGUAGE MODELS FOR CREATING A MULTI-LINGUAL, LOW-RESOURCE CODE TRANSLATION DATASET

(71) Applicants: International Business Machines Corporation, Armonk, NY (US); Massachusetts Institute of Technology, Cambridge, MA (US)

(72) Inventors: Zilu Tang, Cambridge, MA (US); Mayank Agarwal, Somerville, MA (US); Jie Chen, Briarcliff Manor, NY (US); Alexander Gregory Shypula, East Brunswick, NJ (US); Bailin Wang, Cambridge, MA (US); Yoon Hyung Kim, Cambridge, MA (US)

(73) Assignees: International Business Machines Corporation, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 211 days.

(21) Appl. No.: 18/228,423

(22) Filed: Jul. 31, 2023

(65) Prior Publication Data
US 2025/0045185 A1     Feb. 6, 2025

(51) Int. Cl.
*G06F 11/3604* (2025.01)
*G06F 8/51* (2018.01)
(Continued)

(52) U.S. Cl.
CPC ............ *G06F 11/3608* (2013.01); *G06F 8/51* (2013.01); *G06F 40/47* (2020.01); *G06F 40/51* (2020.01)

(58) Field of Classification Search
CPC ........ G06F 11/3608; G06F 8/51; G06F 40/47; G06F 40/51
(Continued)

(56) References Cited

U.S. PATENT DOCUMENTS 10,007,594 B2 * 6/2018 Andrejko ............ G06F 11/3684
10,185,713 B1 * 1/2019 Denkowski ............. G06F 40/51
(Continued)

FOREIGN PATENT DOCUMENTS

CN          112905188 A      6/2021

OTHER PUBLICATIONS

Roziere, Baptiste, et al. "Leveraging automated unit tests for unsupervised code translation." arXiv preprint arXiv:2110.06773 (2021). pp. 1-20. (Year: 2021).*
(Continued)

*Primary Examiner* — Satish Rampuria
(74) *Attorney, Agent, or Firm* — Robert Richard Aragona; Otterstedt & Kammer PLLC

(57) ABSTRACT

One or more unit-test cases are generated from a monolingual code corpus and the generated unit-test cases are filtered to generate a corpus of unit-test cases which have acceptability scores exceeding one or more predefined thresholds. One or more of the code samples of the monolingual code corpus are translated from a source language to a target language using a pretrained Large Language Model and the generated unit-test cases are translated from the source language to the target language. The LLM-translated code samples are validated using the translated unit-test cases and a parallel-data training corpus comprising the LLM-translated code samples that pass the validation is created. The pretrained large language model (LLM) is fine-tuned using the parallel-data training corpus, a given code segment is translated using the fine-tuned large lan- (Continued)

guage model (LLM), the translated given code segment is tested and the tested given code segment is deployed.

20 Claims, 3 Drawing Sheets

(51) Int. Cl.
　　*G06F 40/47*　　　(2020.01)
　　*G06F 40/51*　　　(2020.01)
(58) Field of Classification Search
　　USPC .................................................. 717/120–178
　　See application file for complete search history.

(56) References Cited

U.S. PATENT DOCUMENTS

| | | | |
|---|---|---|---|
| 10,324,695 | B2 | 6/2019 | Champagne |
| 10,606,573 | B2 | 3/2020 | Apte |
| 10,664,381 | B2 | 5/2020 | Walters |
| 10,684,943 | B2 * | 6/2020 | Fei .................... G06F 18/24155 |
| 10,740,694 | B2 | 8/2020 | Harvill |
| 10,783,456 | B2 | 9/2020 | Strope |
| 10,996,935 | B2 | 5/2021 | Jonnadula |
| 11,037,028 | B2 * | 6/2021 | Bojar ..................... G06N 3/044 |
| 11,133,001 | B2 | 9/2021 | Andreas |
| 11,145,291 | B2 | 10/2021 | Rusak |
| 11,194,550 | B2 | 12/2021 | Davis |
| 11,257,272 | B2 | 2/2022 | Rowell |
| 11,269,605 | B1 * | 3/2022 | Nandanuru ............... G06F 8/51 |
| 11,574,017 | B2 * | 2/2023 | Boxwell .............. G06F 40/131 |
| 11,893,363 | B2 * | 2/2024 | Drain ....................... G06N 7/01 |
| 11,984,116 | B2 * | 5/2024 | Haikin .................... G10L 15/06 |
| 12,001,325 | B2 * | 6/2024 | Adachi ............... G06F 11/3688 |
| 2007/0043553 | A1 * | 2/2007 | Dolan ..................... G06F 40/47 |
| | | | 704/2 |
| 2019/0340466 | A1 | 11/2019 | Berseth |
| 2022/0066747 | A1 * | 3/2022 | Drain ..................... G06N 3/045 |
| 2022/0084510 | A1 | 3/2022 | Peng |

OTHER PUBLICATIONS

Tufano, Michele, et al. "Unit test case generation with transformers and focal context." arXiv preprint arXiv:2009.05617 (2020). pp. 1-15. (Year: 2020).*

Palomba, Fabio, et al. "Automatic test case generation: What if test code quality matters?." Proceedings of the 25th International Symposium on Software Testing and Analysis. 2016. pp. 130-141. (Year: 2016).*

Ahmed, Toufique, and Premkumar Devanbu. "Multilingual training for software engineering." Proceedings of the 44th International Conference on Software Engineering. 2022.pp. 1443-1455. (Year: 2022).*

Heering, Jan, and Paul Klint. "Towards monolingual programming environments." ACM Transactions on Programming Languages and Systems (TOPLAS) 7.2 (1985): pp. 183-213. (Year: 1985).*

Svyatkovskiy, Alexey, et al. "Intellicode compose: Code generation using transformer." Proceedings of the 28th ACM joint meeting on European software engineering conference and symposium on the foundations of software engineering. 2020. pp. 1433-1443. (Year: 2020).*

Khanuja, Simran, et al. "GLUECoS: An evaluation benchmark for code-switched NLP." arXiv preprint arXiv:2004.12376 (2020). pp. 1-11. (Year: 2020).*

Cai, Deng, et al. "Neural machine translation with monolingual translation memory." arXiv preprint arXiv:2105.11269 (2021). pp. 1-12 (Year: 2021).*

Chen, Fuxiang, et al. "On the transferability of pre-trained language models for low-resource programming languages." Proceedings of the 30th IEEE/ACM international conference on program comprehension. 2022. pp. 401-412 (Year: 2022).*

Cobol Blues downloaded from: http://fingfx.thomsonreuters.com/gfx/rngs/USA-BANKS-COBOL/010040KH18J/index.html Mar. 10, 2023 pp. 3.

Weisz et al., Better Together? An Evaluation of AI-Supported Code Translation. Feb. 15, 2022 pp. 1-35.

Project CodeNet downloaded from: https://github.com/IBM/Project_CodeNet May 5, 2021 pp. 1-8.

CodeXGLUE downloaded from: https://github.com/microsoft/CodeXGLUE/tree/main/Code-Code/code-to-code-trans Mar. 10, 2023 pp. 5.

Pynguin-Python General Unit Test Generator downloaded from: https://pynguin.readthedocs.io/en/latest/ Mar. 10, 2020 pp. 2.

EvoSuite | Automatic Test Suite Generation for Java downloaded from:https://www.evosuite.org/ Sep. 16, 2021 pp. 6.

Information Technology Agencies Need to Develop Modernization Plans for Critical Legacy Systems https://www.gao.gov/assets/700/699616.pdf Jun. 2019 pp. 79.

Introducing IBM Mono2Micro downloaded from: https://www.ibm.com/cloud/blog/announcements/ibm-mono2micro May 6, 2020 pp. 1-10.

Banks scramble to fix old systems as IT 'cowboys' ride into sunset. downloaded from https://www.reuters.com/article/us-usa-banks-cobol/banks-scramble-to-fix-old-systems-as-it-cowboys-ride-into-sunset-idUSKBN17C0D8 on Mar. 10, 2023. pp. 4.

Haluptzok et al., Language Models Can Teach Themselves to Program Better (https://arxiv.org/abs/2207.14502) Apr. 12, 2023 pp. 1-23.

Large language model. Downloaded from https://en.wikipedia.org/wiki/Large_language_model on May 10, 2023. pp. 18.

Conneau et al. "Cross-Lingual Language Model Pretraining", Advances in neural information processing systems, Dec. 2019, Article No. 634, pp. 7059-7069.

Hartvigsen et al. "ToxiGen: A Large-Scale Machine-Generated Dataset for Adversarial and Implicit Hate Speech Detection", arXiv:2203.09509v4 [cs.CL], Jul. 14, 2022, 18 pages.

Ian King. "An Ancient Computer Language Is Slowing America's Giant Stimulus", Technology, Economics, Apr. 13, 2020, 2 pages.

IBM. "Application Modernization Consulting and Services", downloaded from https://web.archive.org/web/20230328011150/https://www.ibm.com/consulting/application-modernization, Mar. 28, 2023, 10 pages.

IBM. "Application Modernization", downloaded from https://www.ibm.com/support/pages/application-modernization, May 18, 2022, 2 pages.

IBM. "Modernize applications for interoperability and ROI", downloaded from https://web.archive.org/web/20210425081107/https://www.ibm.com/cloud/application-modernization, Apr. 25, 2021, 09 Pages.

Lachaux et al. "Unsupervised Translation of Programming Languages", arXiv:2006.03511v3 [cs.CL], Sep. 22, 2020, 21 pages.

Roziere et al. "Leveraging Automated Unit Tests for Unsupervised Code Translation", arXiv preprint arXiv:2110.06773, Feb. 16, 2022, 20 pages.

* cited by examiner

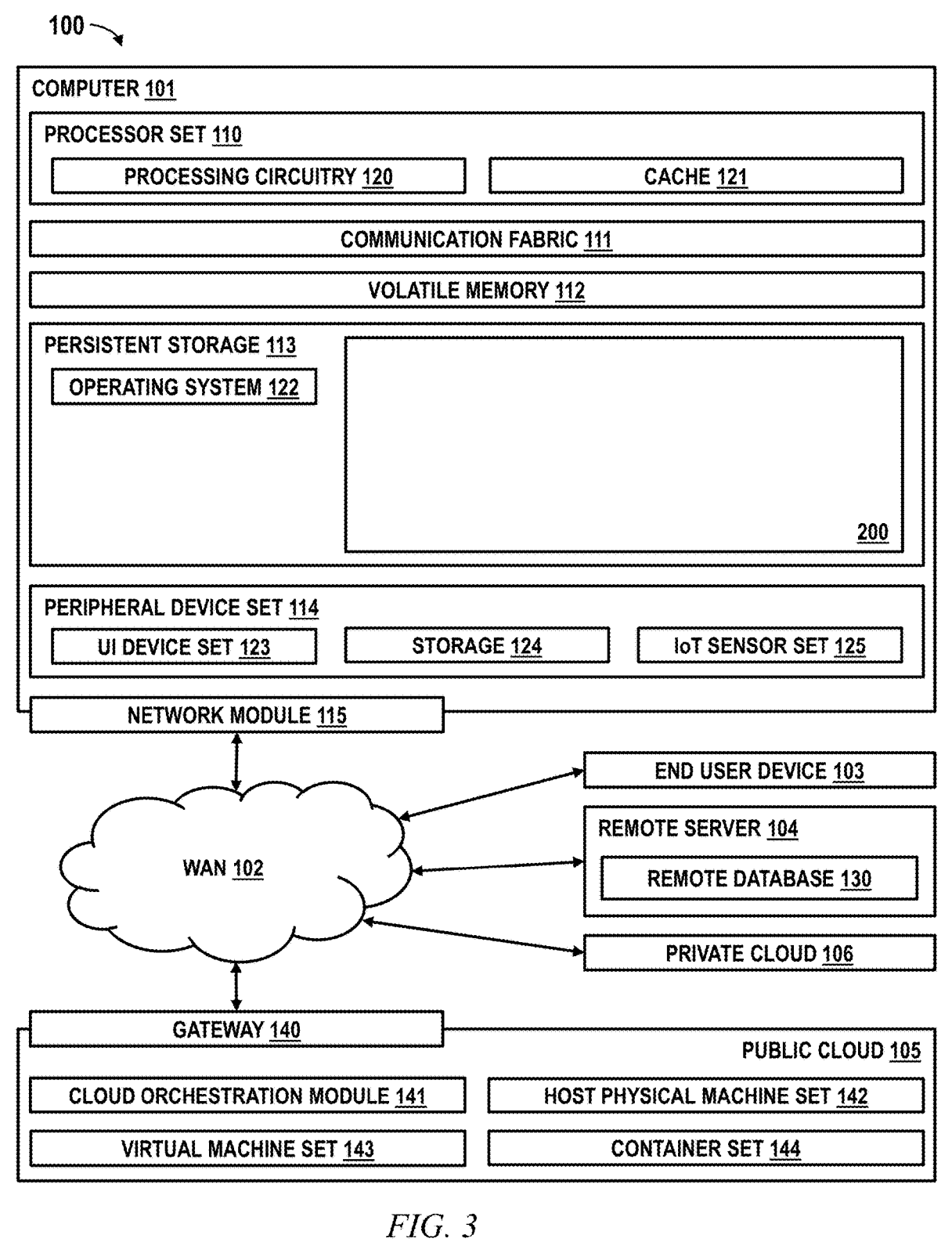

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 3

LARGE LANGUAGE MODELS FOR CREATING A MULTI-LINGUAL, LOW-RESOURCE CODE TRANSLATION DATASET

BACKGROUND

The present invention relates generally to the electrical, electronic and computer arts and, more particularly, to computer-aided software design, machine translation, and generative modeling.

Code translation is the task of translating source code from one language to another. It is primarily utilized in application modernization, where applications built in legacy languages, such as Common Business Oriented Language (COBOL) and Formula Translation (FORTRAN), need to be re-written in a modern language. Application modernization and code translation is a task-intensive process, whereby large teams of programmers work, potentially for years, to complete the modernization task. Machine learning (ML) systems that can learn from training data to translate code can greatly reduce the time and effort that a manual conversion of the applications would require. Training these machine learning systems for code translation, however, requires a large amount of parallel data; that is, samples of code implementing the same functionality in different languages. Availability of this data is quite limited for low-resource languages (such as COBOL and FORTRAN), thus limiting the availability of ML code translation systems for the task.

Artificial Intelligence for Code (AI4Code) aims to integrate recent advances in artificial intelligence (AI) to various sub-tasks in the programming domain and is an emerging field of focus for both the research and the business community. Code translation is one such avenue, where the aim is to translate code from one programming language to another. It is useful to modernize code bases written in legacy programming languages to a modern programming language, among others. Long periods of time and large amounts of money can be required to modernize an existing code base and, more recently, a government system implemented in the legacy language (COBOL) slowed the disbursement of government benefits. A large amount of code written in COBOL is in use today, and the U.S. Government Accountability Office recently urged multiple agencies to modernize their critical legacy technology.

BRIEF SUMMARY

Principles of the invention provide systems and techniques for large language models for creating a multi-lingual, low-resource code translation dataset. In one aspect, an exemplary method includes the operations of generating, using at least one hardware processor, one or more unit-test cases from a monolingual code corpus; filtering, using the at least one hardware processor, the generated unit-test cases to generate a corpus of unit-test cases which have acceptability scores exceeding one or more predefined thresholds; translating, using the at least one hardware processor, one or more of the code samples of the monolingual code corpus from a source language to a target language using a pretrained Large Language Model (LLM); translating, using the at least one hardware processor, the generated unit-test cases from the source language to the target language; validating, using the at least one hardware processor, the LLM-translated code samples using the translated unit-test cases; creating, using the at least one hardware processor, a parallel-data training corpus comprising the LLM-translated code samples that pass the validation; fine-tuning, using the at least one hardware processor, the pretrained large language model (LLM) using the parallel-data training corpus; translating, using the at least one hardware processor, a given code segment using the fine-tuned large language model (LLM); testing, using the at least one hardware processor, the translated given code segment; and facilitating, using the at least one hardware processor, deployment of the tested given code segment in the target language.

In one aspect, a computer program product comprises one or more tangible computer-readable storage media and program instructions stored on at least one of the one or more tangible computer-readable storage media, the program instructions executable by a processor, the program instructions comprising generating one or more unit-test cases from a monolingual code corpus; filtering the generated unit-test cases to generate a corpus of unit-test cases which have acceptability scores exceeding one or more predefined thresholds; translating one or more of the code samples of the monolingual code corpus from a source language to a target language using a pretrained Large Language Model (LLM); translating the generated unit-test cases from the source language to the target language; validating the LLM-translated code samples using the translated unit-test cases; creating a parallel-data training corpus comprising the LLM-translated code samples that pass the validation; fine-tuning the pretrained large language model (LLM) using the parallel-data training corpus; translating a given code segment using the fine-tuned large language model (LLM); testing the translated given code segment; and facilitating deployment of the tested given code segment in the target language.

In one aspect, a system comprises a memory and at least one processor, coupled to the memory, and operative to perform operations comprising generating one or more unit-test cases from a monolingual code corpus; filtering the generated unit-test cases to generate a corpus of unit-test cases which have acceptability scores exceeding one or more predefined thresholds; translating one or more of the code samples of the monolingual code corpus from a source language to a target language using a pretrained Large Language Model (LLM); translating the generated unit-test cases from the source language to the target language using a rules-based translator; validating the LLM-translated code samples using the translated unit-test cases; creating a parallel-data training corpus comprising the LLM-translated code samples that pass the validation; fine-tuning the pretrained large language model (LLM) using the parallel-data training corpus; translating a given code segment using the fine-tuned large language model (LLM); testing the translated given code segment; and facilitating deployment of the tested given code segment in the target language.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

improving the technological process of machine learning by fine-tuning a generically pretrained large language model to perform code translation from a source programming language to a target programming language;

improving the technological process of computer-aided software engineering by generating a large language model for performing code translation from a source programming language to a target programming language;

support for generating a training corpus for a low-resource language, such as COBOL;

a large language model for translating code segments from a source language to a target language; and a large language model configured to use AI to translate applications written in legacy languages into more modern programming languages, which can be tested and deployed to replace the legacy applications.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 3 depicts a computing environment according to an embodiment of the present invention.

Figure 1:
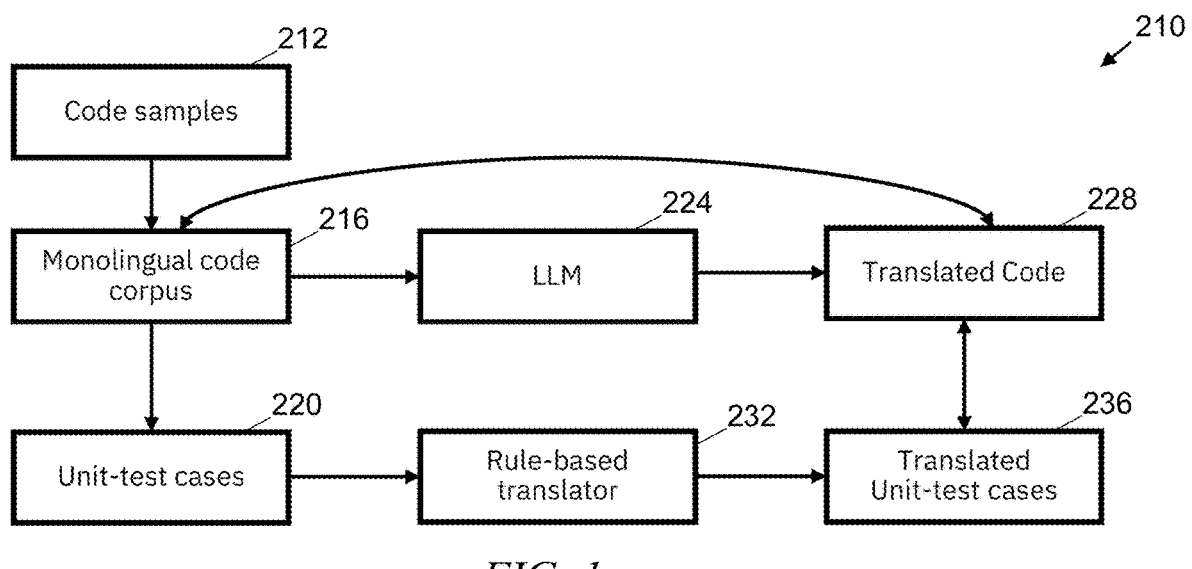
FIG. 1 is a workflow for an example method for utilizing and fine-tuning a Large Language Model (LLM) to generate a parallel corpus for training a code translator and for performing code translation, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Generally, techniques, methods, and systems for utilizing and fine-tuning large language models for generating a multi-lingual, low-resource code translation training dataset and/or for performing code translation are disclosed. It is recognized that AI can help developers more quickly achieve, for example, an application modernization task, by translating code to a target language, and then relying on the developer to verify and fix the translated code (rather than translating the code from scratch). Training these AI models, however, requires parallel-data, that is, functional code in multiple programming languages, which is exceptionally rare. This lack of parallel-data is exaggerated for low-resource or legacy-languages, such as COBOL and FORTRAN. In one example embodiment, the generalization capabilities of large language models (LLMs; for example, multi-billion parameter machine learning models trained in an unsupervised manner on data from the Internet) are used along with automated unit-test case creators (generation tools) to create parallel-data for code translation, such as between multiple programming languages, including low-resource languages such as COBOL, FORTRAN, and the like. Generally, "large language model (LLM)" is used herein in its ordinary sense, namely, a language model including a neural network with many parameters (typically billions of weights or more), trained on large quantities of unlabeled text using self-supervised learning or semi-supervised learning. In this context, "large" is not a relative term but has a known meaning for the skilled artisan.

In one example embodiment, a system for generating a parallel corpora for code translation in multiple programming languages is created. The corpora contain functionally-equivalent implementation of logic in multiple programming languages. Conventional techniques perform training using multiple, monolingual corpora (training a code-translation model using unsupervised training and using only the monolingual corpus of code, or potentially multiple, monolingual corpora). The conventional techniques also perform training using parallel corpora by creating a parallel corpus from the code of projects that have implementations in multiple programming languages. (Functions that perform the same calculations or the same tasks are paired together to create the dataset.)

Figure 2:
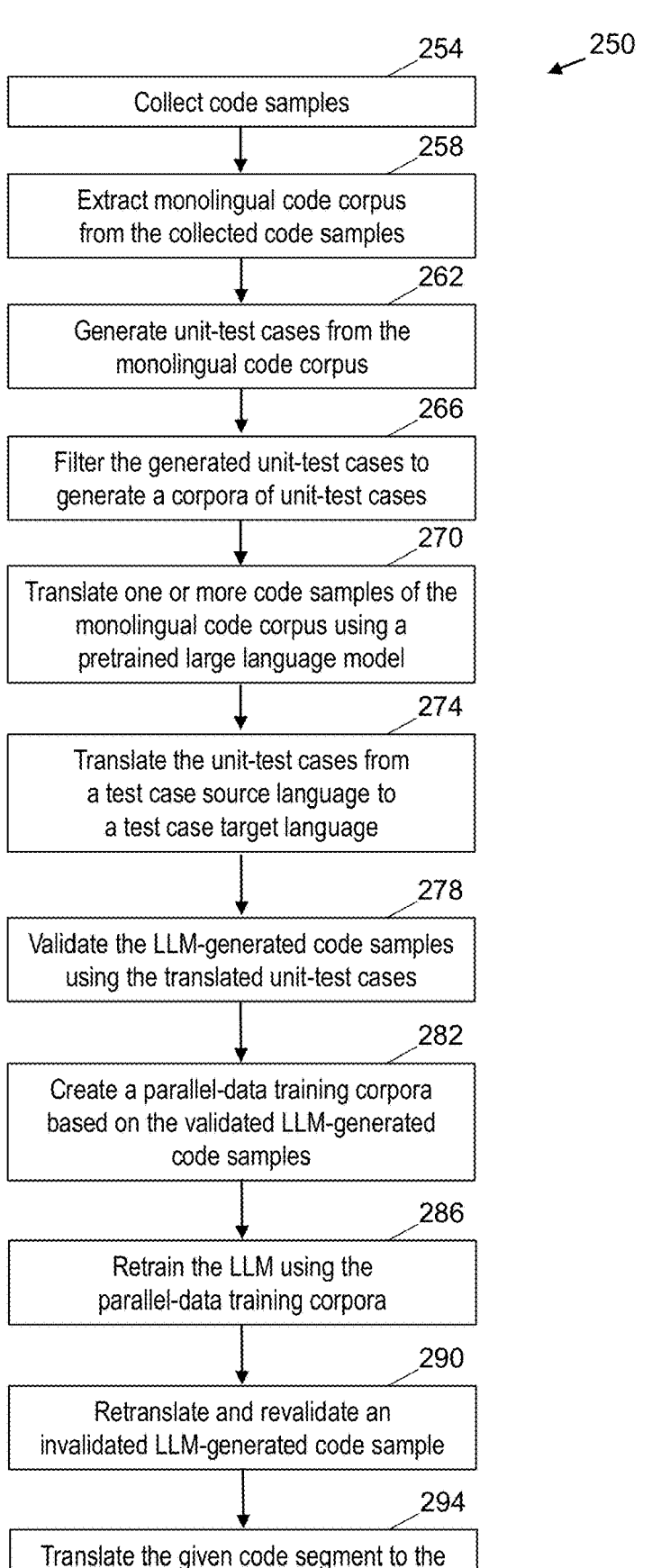
FIG. 2 is a flowchart for an example method for utilizing and fine-tuning an LLM capable of generating a parallel corpus for training a code translator and for performing code translation, in accordance with an example embodiment.

FIG. 1 is a workflow for an example method 210 for utilizing and fine-tuning an LLM 224 to generate a parallel corpus for training a code translator and for performing code translation, in accordance with an example embodiment. FIG. 2 is a flowchart for an example method 250 for utilizing and fine-tuning an LLM 224 capable of generating a parallel corpus for training a code translator and for performing code translation, in accordance with an example embodiment. In one example embodiment, code samples 212 in various programming languages are collected (operation 254). For example, code samples in Java may be collected from conventional code databases, a codebase, and the like. A monolingual code corpus 216 is extracted from the collected code samples (operation 258). The code samples 212 and the monolingual code corpus 216 may be obtained, for example, using a structured query language (SQL) query to identify the code samples from one or more available databases of code samples.

Unit-test cases 220 are generated from the monolingual code corpus 216 created in operation 258, utilizing known toolkits (operation 262). For example, unit-test cases 220 may be generated for the Java code samples of the monolingual code corpus 216 using the known toolkits. The generated unit-test cases 220 are filtered to cases which pass a functionality test and which have high toolkit-metrics, such as in regard to mutation scores and the like, to retain only the high-quality test cases (operation 266). In particular, each function is tested using a number of different tests and corresponding results. In one example embodiment, criteria of the high-quality test cases include coverage (such as how many of the statements in the program have been executed), mutation (such as whether the test will return a different output when a fault is created in a program), and the like.

A pretrained Large Language Model (LLM) 224 is used to translate code samples of the monolingual code corpus 216 from a source language, such as Java, to translated code 228 in a target language, such as COBOL (operation 270). In one example embodiment, the Large Language Model 224 was pretrained in an unsupervised manner and not for any particular task, such as it is trained to predict the next word given the previous words; the LLM 224 may or may not have been pretrained using code samples, or code samples in the source or target programming languages. Prompt engineering is used to specify the translation task to the LLM 224. (In prompt engineering, the input to the AI system includes a description of the task to be performed. Prompt engineering is conventionally based on a prompt-based dataset and a language model trained with prompt-based learning.) For example, the following prompt engineering may be utilized:

```
Translate this code from Java to COBOL
Java code
<code>
COBOL code
```
```

(Note: LLMs 224 are trained in an unsupervised manner; therefore, parallel corpora are not needed to perform preliminary code translation.)

The generated unit-test cases 220 in the source language, such as Java, are translated to the target language, such as COBOL (operation 274). The generated unit-test cases 220 are expected input-output pairs with assert statements. It is noted that the translation of the unit-test cases 220 to the translated unit-test cases 236 is generally easier than the translation of the code samples of the monolingual code corpus 216 due to their simplicity. Thus, in example embodiments, a rule-based translator 232 having inference conditions is utilized to translate the unit-test cases 220. (The skilled person is familiar with rule-based translators, processes that translate text based on a set of defined rules.) In general, the translation of the unit-test cases 220 using the rule-based translator 232 is remarkably more accurate than the LLM translation of the sample code of the monolingual code corpus 216, at least at this point in the process, since the LLM 224 has not yet been fine-tuned for the task of code translation. Thus, the LLM-translated code 228 is validated using the more reliable translated unit-test cases 236 (operation 278). For example, the Java samples of the monolingual code corpus 216 translated to COBOL by the LLM 224 (the translated code 228) are tested. Those which pass the corresponding translated unit-test cases 236 are retained and a Java⇔COBOL data pair of code samples are created for the same (operation 282). The COBOL samples which fail their corresponding translated unit-test cases 236 are excluded from the final parallel corpora at this time. In one example embodiment, the COBOL samples which fail all of their corresponding translated unit-test cases 236 are excluded from the final parallel corpora at this time. In one example embodiment, the COBOL samples which fail any of their corresponding translated unit-test cases 236 are excluded from the final parallel corpora at this time. In one or more embodiments, operations 270-282 are repeated for the entire monolingual code corpus 216 to create a parallel corpus for code translation (a decision block and corresponding logic are omitted from the flowchart of FIG. 2 to avoid clutter).

In one example embodiment, the large language model 224 is then fine-tuned (retrained) using the created parallel corpus (operation 286). In one example embodiment, the code translation process is repeated on the code samples of the monolingual code corpus 216 that failed their corresponding translated unit-test cases 236, thereby increasing the number of parallel data-points in the parallel corpus (operation 290). In one or more embodiments, the performance of this step depends, for example, on the size of the LLM 224 and the availability of compute resources. For example, for larger LLMs 224 or black-boxed LLMs 224, it might not be possible to fine-tune the LLM 224 if access is restricted by an application programming interface (API). (A black-box LLM means an LLM that cannot be fine-tuned. For example, a black-box LLM may be hosted in a manner that does not allow users to change the LLM; users can only use the LLM.) Given the teachings herein, it would be apparent to the skilled artisan that various combinations of operations of the method 250 can be repeated multiple times as desired to further refine the LLM 224 and/or further augment the parallel corpus. In one example embodiment, as part of operation 278, the translated unit-test cases 236 are executed on both the original code samples of the monolingual code corpus 216 and the translated code 228 to verify that the two pieces of code are functionally equivalent.

In one example embodiment, code translation from the source language of a given code segment of code to a given target language is performed using the LLM 224 to, for example, perform application modernization (operation 294).

Experiments

In experiments, approximately 130,000 Java samples were obtained from a publicly-accessible code repository, and a publicly available tool that automatically generates test cases with assertions for classes written in Java code was used to generate the unit-test cases 220 for the Java samples. A large language model was used to translate these samples to Python and COBOL. Using the described procedure, the following were created:

a Java ← → parallel corpus with ~60,000 code samples; and
a Java ← → COBOL corpus with ~25,000 code samples.

It is highlighted that, on a publicly-accessible code repository, there are only about 2,500 COBOL documents, but through the disclosed procedure, about 10 times more COBOL data was created. Thus, example embodiments provide a pipeline that generates parallel data for low-resource languages based on the use of large language models 224 and automated test generation tools. In one example embodiment, programming language translation is performed by an engineering prompt that is used by a large language model 224. In one example embodiment, the translation results are verified based on automated test generation for the source language and a rule-based conversion to the target language. It is noted that a model pretrained specifically for code translation would not work well for a low-resource language due to the large training data requirements of such models; the disclosed LLM technique enables support for a low-resource language as it does not require a large amount of training data in the given language.

Given the discussion thus far, it will be appreciated that, in general terms, an exemplary method, according to an aspect of the invention, includes the operations of generating, using at least one hardware processor, one or more unit-test cases 220 from a monolingual code corpus 216 (operation 262); filtering, using the at least one hardware processor, the generated unit-test cases 220 to generate a corpus of unit-test cases which have acceptability scores exceeding one or more predefined thresholds (operation 266); translating, using the at least one hardware processor, one or more of the code samples of the monolingual code corpus 216 from a source language to a target language using a pretrained Large Language Model (LLM) 224 (operation 270); translating, using the at least one hardware processor, the generated unit-test cases 220 from the source language to the target language (operation 274); validating, using the at least one hardware processor, the LLM-translated code samples 228 using the translated unit-test cases 236 (operation 278); creating, using the at least one hardware processor, a parallel-data training corpus comprising the LLM-translated code samples 228 that pass the validation (operation 282); fine-tuning, using the at least one hardware processor, the pretrained large language model (LLM) using the parallel-data training corpus; translating, using the at least one hardware processor, a given code segment using the fine-tuned large language model (LLM); testing, using the at least one hardware processor, the translated given code segment; and facilitating, using the at least one hardware processor, deployment of the tested given code segment in the target language. In one example embodiment, the tested given code segment is deployed as a replacement for a legacy application.

In one example embodiment, one or more code samples 212 in one or more programming languages are collected (operation 254); and the monolingual code corpus 216 is extracted from the collection of code samples 212 (operation 258).

In one example embodiment, the filtering of the generated unit-test cases 220 further comprises retaining the generated unit-test cases 220 that have toolkit-metrics exceeding one or more predefined thresholds. The skilled artisan can use heuristics to define the appropriate predefined thresholds depending on the domain of interest. For example, a predefined threshold can be a mutation score of greater than 90% and/or a coverage score of greater than 80%.

In one example embodiment, code translation of a given segment of code from the source language to the target language is performed using the Large Language Model 224 (operation 294).

In one example embodiment, the Large Language Model 224 is a multi-billion parameter machine learning model pretrained in an unsupervised manner.

In one example embodiment, the parallel-data training corpus comprises functionally-equivalent implementation of logic in multiple programming languages.

In one example embodiment, the generated unit-test cases 220 are expected input-output pairs with assert statements.

In one example embodiment, the translating of the one or more of the code samples of the monolingual code corpus 216, the validating, and the creating operations are repeated for all code samples of the monolingual code corpus 216.

In one example embodiment, the large language model 224 is retrained using the parallel-data training corpus (operation 286).

In one example embodiment, the translating of the one or more of the code samples of the monolingual code corpus 216, the validating, and the creating operations are repeated for code samples of the monolingual code corpus 216 that failed the validation operation (operation 290).

In one example embodiment, the code samples of the monolingual code corpus 216 and the translated code 228 are verified as being functionally equivalent using the translated unit-test cases 236 (operation 278).

In one example embodiment, the acceptability scores are one or more of a coverage score and a mutation score.

In one example embodiment, a deployed legacy application is run.

In one aspect, a computer program product comprises one or more tangible computer-readable storage media and program instructions stored on at least one of the one or more tangible computer-readable storage media, the program instructions executable by a processor, the program instructions comprising generating one or more unit-test cases 220 from a monolingual code corpus 216 (operation 262); filtering the generated unit-test cases 220 to generate a corpus of unit-test cases which have acceptability scores exceeding one or more predefined thresholds (operation 266); translating one or more of the code samples of the monolingual code corpus 216 from a source language to a target language using a pretrained Large Language Model (LLM) 224 (operation 270); translating the generated unit-test cases 220 from the source language to the target language (operation 274); validating the LLM-translated code samples 228 using the translated unit-test cases 236 (operation 278); creating a parallel-data training corpus comprising the LLM-translated code samples 228 that pass the validation (operation 282); fine-tuning the pretrained large language model (LLM) using the parallel-data training corpus; translating a given code segment using the fine-tuned large language model (LLM); testing the translated given code segment; and facilitating deployment of the tested given code segment in the target language.

In one aspect, an apparatus comprises a memory and at least one processor, coupled to the memory, and operative to perform operations comprising generating one or more unit-test cases 220 from a monolingual code corpus 216 (operation 262); filtering the generated unit-test cases 220 to generate a corpus of unit-test cases which have acceptability scores exceeding one or more predefined thresholds (operation 266); translating one or more of the code samples of the monolingual code corpus 216 from a source language to a target language using a pretrained Large Language Model (LLM) 224 (operation 270); translating the generated unit-test cases 220 from the source language to the target language using a rules-based translator 232 (operation 274); validating the LLM-translated code samples 228 using the translated unit-test cases 236 (operation 278); creating a parallel-data training corpus comprising the LLM-translated code samples 228 that pass the validation (operation 282); fine-tuning the pretrained large language model (LLM) using the parallel-data training corpus; translating a given code segment using the fine-tuned large language model (LLM); testing the translated given code segment; and facilitating deployment of the tested given code segment in the target language.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code translation system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating, using at least one hardware processor, one or more unit-test cases from a monolingual code corpus;
filtering, using the at least one hardware processor, the generated unit-test cases to generate a corpus of unit-test cases which have acceptability scores exceeding one or more predefined thresholds;
translating, using the at least one hardware processor, one or more code samples of the monolingual code corpus from a source language to a target language using a pretrained large language model (LLM);
translating, using the at least one hardware processor, the generated unit-test cases from the source language to the target language;
validating, using the at least one hardware processor, the LLM-translated code samples using the translated unit-test cases;
creating, using the at least one hardware processor, a parallel-data training corpus comprising the LLM-translated code samples that pass the validation;
fine-tuning, using the at least one hardware processor, the pretrained large language model (LLM) using the parallel-data training corpus;
translating, using the at least one hardware processor, a given code segment using the fine-tuned large language model (LLM);
testing, using the at least one hardware processor, the translated given code segment; and
facilitating, using the at least one hardware processor, deployment of the tested given code segment in the target language.

2. The method of claim 1, further comprising:
collecting one or more the one or more of the code samples in one or more programming languages; and extracting the monolingual code corpus from the collection of code samples.

3. The method of claim 2, wherein the filtering of the generated unit-test cases further comprises retaining the generated unit-test cases that have toolkit-metrics exceeding the one or more predefined thresholds.

4. The method of claim 2, further comprising performing code translation of the given segment of code in the source language to the target language using the Large Language Model.

5. The method of claim 2, wherein the large language model is a multi-billion parameter machine learning model pretrained in an unsupervised manner.

6. The method of claim 2, wherein the parallel-data training corpus comprises functionally-equivalent implementation of logic in multiple programming languages.

7. The method of claim 2, wherein the generated unit-test cases are expected input-output pairs with assert statements.

8. The method of claim 2, further comprising repeating the translating of the one or more of the code samples of the monolingual code corpus, the validating, and the creating operations for all code samples of the monolingual code corpus.

9. The method of claim 2, further comprising retraining the large language model using the parallel-data training corpus.

10. The method of claim 2, further comprising repeating the translating of the one or more of the code samples of the monolingual code corpus, the validating, and the creating operations for code samples of the monolingual code corpus that failed the validation operation.

11. The method of claim 2, further comprising verifying that the code samples of the monolingual code corpus and the translated code are functionally equivalent using the translated unit-test cases.

12. The method of claim 1, wherein the acceptability scores are one or more of a coverage score and a mutation score.

13. The method of claim 1, further comprising running the deployed tested given code segment.

14. A computer program product, comprising:
one or more tangible computer-readable storage media and program instructions stored on at least one of the one or more tangible computer-readable storage media, the program instructions executable by a processor, the program instructions comprising:
generating one or more unit-test cases from a monolingual code corpus;
filtering the generated unit-test cases to generate a corpus of unit-test cases which have acceptability scores exceeding one or more predefined thresholds;
translating one or more code samples of the monolingual code corpus from a source language to a target language using a pretrained Large Language Model (LLM);
translating the generated unit-test cases from the source language to the target language;
validating the LLM-translated code samples using the translated unit-test cases;
creating a parallel-data training corpus comprising the LLM-translated code samples that pass the validation;
fine-tuning the pretrained large language model (LLM) using the parallel-data training corpus;
translating a given code segment using the fine-tuned large language model (LLM);
testing the translated given code segment; and facilitating deployment of the tested given code segment in the target language.

15. An apparatus comprising:

a memory; and at least one processor, coupled to said memory, and operative to perform operations comprising:

generating one or more unit-test cases from a monolingual code corpus;

filtering the generated unit-test cases to generate a corpus of unit-test cases which have acceptability scores exceeding one or more predefined thresholds;

translating one or more code samples of the monolingual code corpus from a source language to a target language using a pretrained Large Language Model (LLM);

translating the generated unit-test cases from the source language to the target language using a rules-based translator;

validating the LLM-translated code samples using the translated unit-test cases; and creating a parallel-data training corpus comprising the LLM-translated code samples that pass the validation;

fine-tuning the pretrained large language model (LLM) using the parallel-data training corpus;

translating a given code segment using the fine-tuned large language model (LLM);

testing the translated given code segment; and facilitating deployment of the tested given code segment in the target language.

16. The apparatus of claim 15, the operations further comprising:

collecting one or more code samples in one or more programming languages; and extracting the monolingual code corpus from the collection of the one or more of the code samples.

17. The apparatus of claim 16, wherein the filtering of the generated unit-test cases further comprises retaining the generated unit-test cases that have toolkit-metrics exceeding the one or more predefined thresholds.

18. The apparatus of claim 16, the operations further comprising performing code translation of the given segment of code in the source language to the target language using the large language model.

19. The apparatus of claim 16, the operations further comprising retraining the large language model using the parallel-data training corpus.

20. The apparatus of claim 16, the operations further comprising verifying that the code samples of the monolingual code corpus and the translated code are functionally equivalent using the translated unit-test cases.

* * * * *